United States Patent [19]
Carney et al.
[11] 4,337,495
[45] Jun. 29, 1982

[54] CARBON ELECTRODE HAVING METALLIC HEAT SINK

[75] Inventors: William V. Carney, Oyster Bay; Loren A. Singer, Jr., Mamaroneck, both of N.Y.

[73] Assignee: Porta Systems Corp., Syosset, N.Y.

[21] Appl. No.: 177,812

[22] Filed: Jun. 13, 1980

[51] Int. Cl.[3] .............................................. H02H 3/22
[52] U.S. Cl. .................................... 361/119; 313/352
[58] Field of Search .................... 361/119; 313/39, 46, 313/352, 354

[56] References Cited

U.S. PATENT DOCUMENTS

| | | | |
|---|---|---|---|
| 2,886,737 | 5/1959 | Fruengel | 313/352 |
| 3,252,038 | 5/1966 | Calvesbert et al. | 313/352 X |
| 4,148,089 | 4/1979 | Kerns et al. | 361/119 |

*Primary Examiner*—Harry E. Moose, Jr.
*Attorney, Agent, or Firm*—Charles E. Temko

[57] ABSTRACT

A composite type electrode for use with telephone protector modules, including a carbon facing adapted to provide sufficient resistance to arcing, and a metallic alloy bonded to the facing having a relatively high specific heat thereby forming a heat sink capable of absorbing a substantial portion of the heat generated during a continuous excess current surge prior to the actuation of a heat coil assembly or other firing element.

1 Claim, 2 Drawing Figures

CARBON ELECTRODE HAVING METALLIC HEAT SINK

BACKGROUND OF THE INVENTION

This invention relates generally to the field of telephone protector modules of a type employed for protecting individual telephone subscriber circuits, and more particularly to an improved carbon element capable of withstanding the effects of heat generated by the transmission therethrough of very high current flow.

As is known in the art, protector modules are usually installed upon a protector block mounted upon a mainframe in a telephone office to prevent the conducting of high current surges through office switching and other equipment, and to prevent damage to the subscriber circuit wiring by conducting such surges to a source of ground potential. Such devices are normally provided with several pairs of carbon electrodes which are in series with the tip and ring circuits of each line, the pairs of carbons defining gaps over which momentary surges of current may arc to be conducted to ground potential. When the surge is of longer duration, as occurs, for example when a high tension line has fallen on the telephone line, heat caused by current flow melts a lead pellet or soldered joint forming part of a heat detecting means. Upon melting, a resiliently actuated component forms a direct contact with ground potential, bypassing the electrodes. Once this actuation has occurred, the individual subscriber line is disabled, and can be returned to operative condition only by replacing the protector module. It is for this reason that the carbon electrodes are provided which will normally withstand many momentary surges without disabling the subscriber circuits.

While this known construction has functioned reasonably well, a problem does exist in that the melting of the solder, depending upon the magnitude of the excess current flow normally requires a period of between fifteen to forty seconds, and during this period, the current will arc through the carbon electrodes to reach ground potential. Current flows of as much as two hundred fifty amperes are common, and the heat developed thereby is often sufficient not only to destroy the module, but other modules positioned upon the same protector block, thereby disrupting service in the related subscriber circuits as well. Given the typical resistance of normal carbon electrodes of approximately 0.1 ohm, the average wattage carried by the carbon prior to the firing of the protective device is approximately four thousand watts, and the heat developed in the carbon is approximately fifteen hundred degrees Fahrenheit reached during the above mentioned fifteen to forty second period. The casing element of the module is of necessity electrically insulated, and the synthetic resinous materials normally used for this purpose are not adequate to withstand such temperatures.

There are any conductive materials having relatively high specific heats which are substantially greater than that of the bonded carbon particles used to form the conventional electrode. Most of these are metallic alloys, and do not offer sufficient resistance to arcing in the case of momentary current surges. Such materials are also subject to rapid erosion during arcing, making them unsuitable for use as electrodes after a relatively few number of current surges.

It will be appreciated that because of the relatively limited space available for mounting a module upon a protector block, and the large number of such blocks in use at the present state of development of the art, extensive redesign of existing protector modules to avoid the above described problem is not a feasible alternative.

SUMMARY OF THE INVENTION

Briefly stated, the invention contemplates the provision of an improved electrode construction of composite type, including a major portion of which is formed from a metallic alloy having relatively high specific heat, which serves as a heat sink during that period in which a continuous surge of excess current is present and prior to operation of the heat sensitive means. The capacity of the material to absorb the generated heat during this relatively brief period prevents or lessens the degree of damage to the housing of the involved protector module, and adjacent modules on the protector block. The invention is preferably incorporated into both of each pair of electrodes for maximum efficiency. The opposing surfaces of each pair of electrodes, forming the usual arc gap therebetween are formed by relatively smaller portions of particulate carbon which offer the requisite degree of electrical resistance, and substantial resistance to erosion during periods of arcing.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED EMBODIMENT

Figure 1:
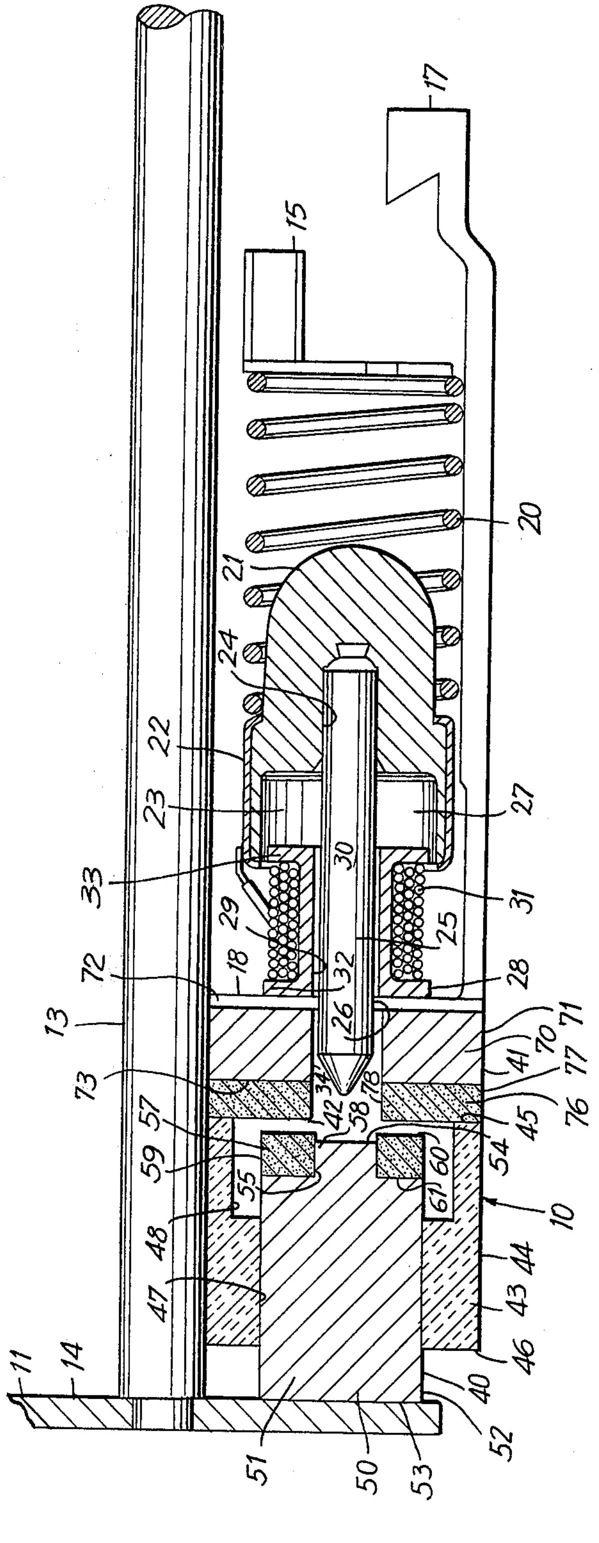
FIG. 1 is a fragmentary schematic view of an embodiment of the invention.

In accordance with the invention, the disclosed embodiment, generally indicated by reference character 10 includes a conventional protector module 11, including a housing (not shown), a grounding pin 13 communicating with a contact plate 14, a short contact 15 leading to a heat coil assembly 16, and a long contact 17 leading to a metallic plate 18. As the details of this construction are conventional, and form no part of the present disclosure, they need not be further considered herein.

Also conventional is a heat sensitive means including a compression spring 20, a molded cap-shaped member 21 having a metallic cap 22 surrounding a two part recess 23. The recess includes an inner part 24 which has an elongated conductive pin 25 which passes through an opening 26 in the plate 18. An outer part 27 of the recess 23 is of greater diameter, and is positioned in movable relation to a heat coil bobbin 28 having a central bore 29 which surrounds and contacts an outer surface 30 of the pin 25. A wire heat coil 31 is positioned between first and second flanges 32 and 33, one end of the coil communicating with the cap 22, and the other (not shown) communicating with the plate 18.

Supported coaxially with respect to the axis of the pin 25 are a first electrode element 40 and a second electrode element 41 which define an air gap 42 therebetween. The first electrode element 40 is supported within a ceramic shield 43, the outer surface 44 of which is a diameter equal to that of the second electrode 41. A front end surface 45 contacts the electrode 41 and thereby establishes the gap 42, as is known in the art. A second end surface 46 is oppositely disposed. Extending coaxially between the end surfaces is a bore 47 and a counterbore 48.

The bore 47 supports a longer electrode 50 including a generally cylindrical body 51 of a metallic alloy such as copper. The body is bounded by a cylindrical surface 52, a first end surface 53 and a second end surface 54. An annular rabbet 55 surrounds the surface 54 and provides a seat for a carbon particle annulus 57 having a central bore 58, and bounded by cylindrical surface 59, a first exposed planar surface 60 and a second concealed planar surface 61.

The second electrode element 41 is of somewhat similar construction, including a such portion 70 of metallic alloy. This portion is bounded by an outer cylindrical surface 71, first and second end surfaces 72 and 73, and a centrally disposed bore 34. A carbon annulus 76 is somewhat larger than the annulus 57, and is bounded by an outer cylindrical surface 77, a centrally disposed bore 78, and first and second end surfaces 60 and 61, the latter being positioned opposite the end surface 53. It will be observed that because of the larger effective diameter of the second electrode element 41 as compared with the first electrode element 40, and the breadth of the counterbore 48, arcing can take place between the electrode elements to impinge not only upon the surface 60 of the annulus 57, but the cylindrical surface 59 as well. This characteristic effectively enlarges the effective contact area of the smaller first electrode element 40, a factor which is particularly useful during periods of excessive current arcing for extended periods.

Operation of the disclosed embodiment is similar to that which occurs in existing prior art devices. However, during extended excessive current surges, the buildup of heat is absorbed by the metallic alloy material which comprises the major part of each electrode element. In the disclosed embodiment, the metallic alloy is preferably a copper alloy. However, adequate results have also been obtained using various types of metallic-ceramic materials, commonly known in the art as cermets. While the precise degree of heating will vary depending upon current flow and the particular heat sink material employed, in each case, an observable lessening in developed heat has been made, whereby the associated protector module may perform its intended function with far less damage to itself and adjacent protector modules.

Figure 2:
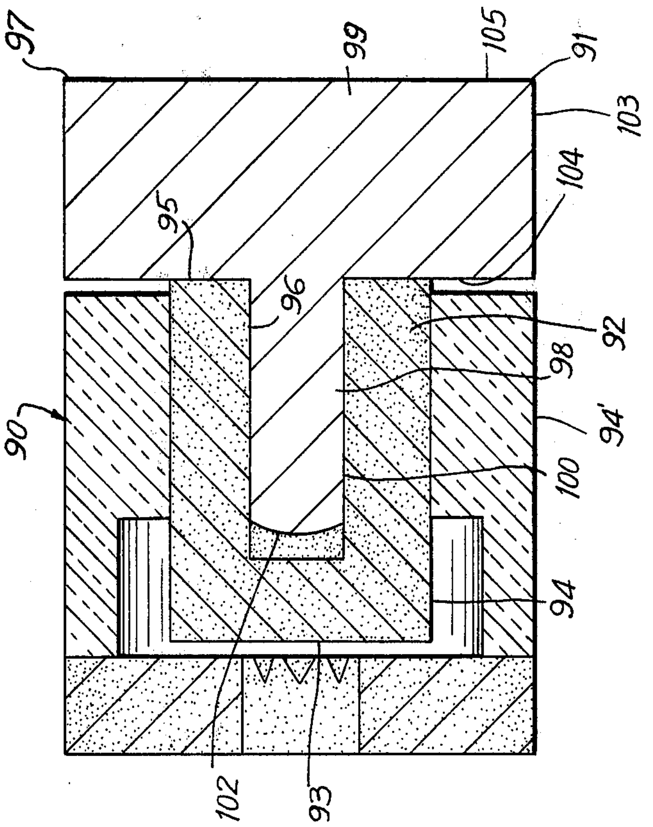
FIG. 2 is a central longitudinal sectional view showing an alternate form of the invention.

Turning now to the alternate form of the embodiment illustrated in FIG. 2, this form differs from the principal form in the configuration of the longer electrode which has a proportionately greater carbon particle content.

In the second embodiment, generally indicated by reference character 90, the longer electrode 91 includes a cylindrical carbon body 92 bounded by an end surface 93, a cylindrical surface 94 and a second end surface 95 leading to a cylindrical bore 96 extending substantially the entire length of the cylindrical body.

Integrated with the body 92 is a metallic body 97 including an elongated shank 98 and a base portion 99. The shank portion 98 is bounded by an outer surface 100 and an end surface 102, the former of which is suitably bonded within the bore 96.

The base portion 99 includes an outer cylindrical surface 103 corresponding to that of the ceramic member 94, an inner end surface 104 which opposes the end surface 95 with a 0.01 inch gap, and an outer end surface 105 which contacts a ground plane (not shown).

Somewhat superior performance has been experience when using the alternate form, which I attribute to superior thermal communication between the carbon and metallic portions of the electrode, and a tendency to transmit heat faster to the base portion of the metallic component.

I wish it to be understood that I do not consider the invention limited to the precise details of structure shown and set forth in this specification, for obvious modifications will occur to those skilled in the art to which the invention pertains.

I claim:

1. In a telephone protector module, of a type incorporating at least one pair of electrodes defining an air gap over which excess current surges are shorted to a source of ground potential, at least one of said electrodes being of a composite construction including a first portion of particulate carbon defining an operative surface facing a corresponding surface on the other of said electrodes, and a second portion bonded thereto of a conductive material having a specific heat substantially greater than that of said first portion, said second portion serving as a heat sink during the transmission of sustained excess current surges, the improvement comprising: said first portion being in the form of a hollow elongated cylinder having a blind bore extending from one end thereof, said bore including a cylindrical surface and an end surface; said second portion having a base of diameter greater than that of said first portion, and having a centrally disposed axially extending shank of diameter corresponding to that of said bore; said shank being disposed within said bore and bonded thereto substantially the entire length of said shank; whereby a substantial area of mutual contact is obtained to facilitate the transfer of heat from said first portion to said second portion during arcing.

* * * * *